D. S. STOVER.
TUBE CLEANER.
APPLICATION FILED JAN. 16, 1914.

1,145,626.

Patented July 6, 1915.

WITNESSES

INVENTOR
Davis S. Stover
BY
Edmonds & Edmonds
ATTORNEYS

UNITED STATES PATENT OFFICE.

DAVIS S. STOVER, OF AMSTERDAM, NEW YORK.

TUBE-CLEANER.

1,145,626. Specification of Letters Patent. Patented July 6, 1915.

Application filed January 16, 1914. Serial No. 812,408.

*To all whom it may concern:*

Be it known that I, DAVIS S. STOVER, a citizen of the United States, residing at Amsterdam, in the county of Montgomery and State of New York, have invented certain new and useful Improvements in Tube-Cleaners, of which the following is a specification.

This invention relates to apparatus for cleaning the tubes of boilers and is directed to the provision of an implement for this purpose which is reliable and efficient in operation, which can be readily manipulated, with which tubes of any length may be cleaned from one end to the other and which may be manufactured at relatively low cost.

One feature of the invention resides in the provision of a cleaning tool secured upon the end of a suitable strip arranged for coaction with operating mechanism whereby the strip and the tool thereon may be moved to carry the tool to the desired position within the tube and then reciprocate the tool to effect the cleaning. Preferably, the strip has a rack formed therein from one end to the other and this rack is engaged by a gear mounted on the frame of the apparatus. The gear is arranged for operation in any suitable manner. It may be actuated manually or a motor may be provided for actuating it. The strip may be in the form of a plurality of sections detachably connected so that as many sections as are required may be employed; I prefer, however, to employ a flexible strip of sheet-metal of substantial length.

Another feature of the invention resides in the provision of means for holding the implement in position. This consists primarily of an expansible part adapted to be inserted within the end of the tube to be cleaned and then expanded so as to cause it to grip the tube and thus position the implement. In this way, the implement may be readily located and held in position with such rigidity as is required.

These and other features of the invention will be better understood by reference to the following description taken in connection with the accompanying drawings which show the preferred embodiment of the invention and in which—

Figure 1:
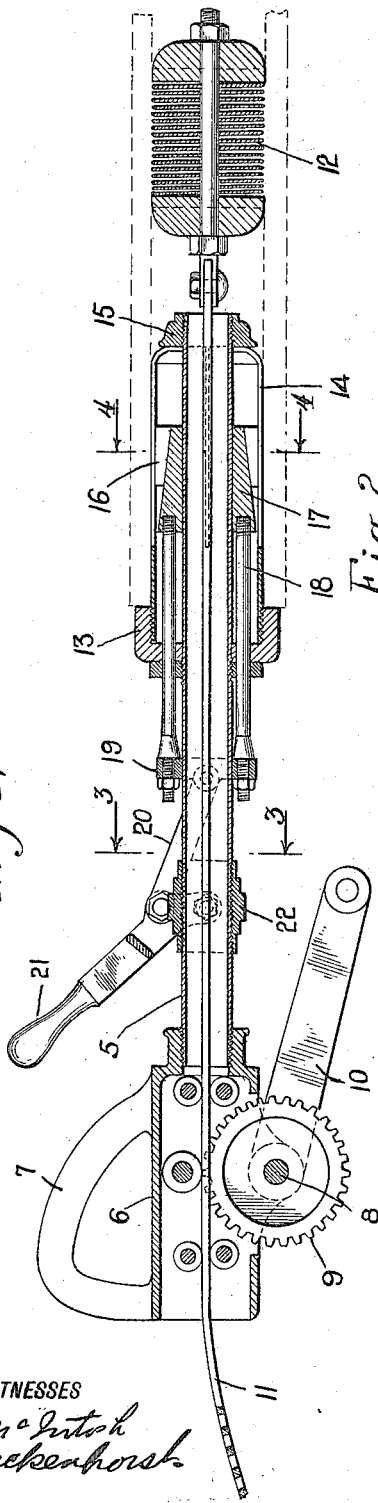
Figure 2:
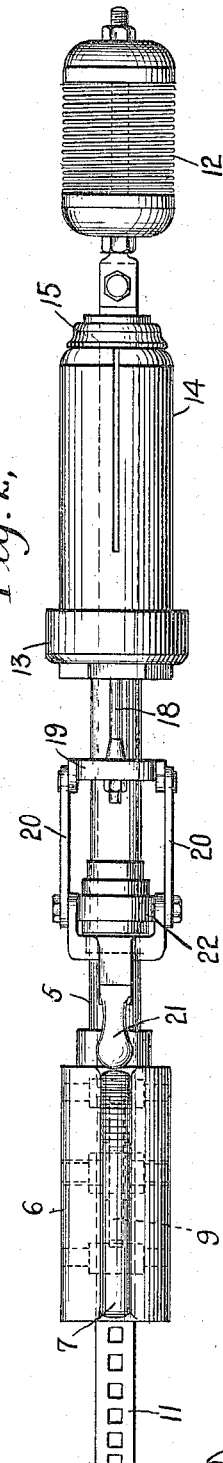
Figure 4:
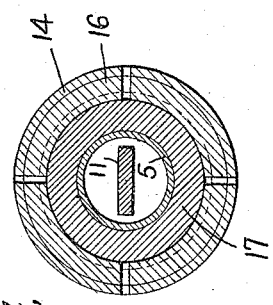
Figure 3:
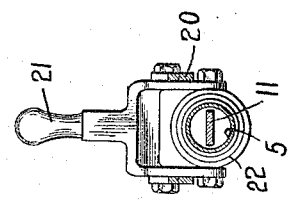

Figure 1 is a central longitudinal section through the implement, Fig. 2 is a top view of the implement and Figs. 3 and 4 are transverse sections on lines 3—3 and 4—4 of Fig. 1.

Referring to these drawings, the tool has a frame in the form of a tubular member 5 having one end secured to a support 6. The latter has a handle 7 formed therein and also bearings for a shaft 8 on which is secured a gear 9. Such mechanism for operating the shaft 8 and gear 9 as may be desired is provided for that purpose. In the present instance, a handle 10 is shown secured to shaft 8, but it will be understood that this shaft 8 may be actuated mechanically by a suitable motor if desired instead of manually as shown.

The gear 9 is adapted to actuate a strip 11 extending through the support 6 and tube 5. This strip has a cleaning tool 12 secured to the end thereof. This tool 12 is of any suitable construction and material. The strip 11 illustrated in the drawings is in the form of a long strip of metal possessing a slight amount of flexibility and it has openings in it as shown in Fig. 2 which constitute a rack adapted to mesh with the gear 9. The strip 11 may be a single piece of sheet-metal or it may be built up from several pieces laid one on another. A small amount of flexibility in the strip 11 is desirable in order that the portion of the strip which is not in use and which extends outwardly from the support 6 will hang down and be suitably supported. Such flexibility is not essential, however, and if stiffness be found desirable, the strip may be of sectional form, the several sections being formed to have their ends detachably connected together.

The tubular member 5 has a flange formed thereon for engagement with the end of a tube of a boiler. In the present instance, this flange is provided by a collar 13 secured upon the tube 5. Adjacent to this collar is an expansible member, the parts of which may be expanded into gripping relation to the interior walls of a boiler tube. A split tube is shown at 14 encircling the tube 5 and having one end threaded to coact with threads on the collar 13. This tube 14 is divided into four or more sections by slots or cuts therein extending lengthwise thereof. The ends of the sections of tube 14 are turned inwardly and lie close to a nut 15 on the end of tube 5. Secured to each of the sections of tube 14 within the tube is a block 16 having an inclined inner surface as shown in Fig. 1. These several blocks 16 are adapted to be engaged by a ring 17 having a tapered exterior surface. The ring 17 is carried upon the ends of a plurality of bolts 18 which pass through the collar 13 and are secured to a head or ring 19 encircling the tube 5 and movable thereon. This head 19 is connected by links 20 to an operating handle 21 and the latter is pivotally mounted upon a ring 22 which is secured to the tube 5.

When using the apparatus, the tool 12 and the split tube 14 are inserted in the end of a tube of a boiler until the circumferential flange formed by the side of the collar 13 engages the end of the tube. The operator then moves the handle 21 so as to cause movement of the parts 19, 18 and 17 to the right in Fig. 1. The ring 17, when moved thus, engages the blocks 16 on the sections of the tube 14 and the inclined surfaces coact in such a manner as to force the sections of tube 14 outwardly into hard contact with the walls of the tube of the boiler. The gripping action which thus takes place is at the end of the tube 14 distant from the collar 13 and is therefore inwardly a substantial distance from the end of the tube of the boiler. The gripping action therefore takes place upon a portion of the tube other than that which is secured in the header of the boiler. The implement having been positioned thus, the operator turns the gear 9 so as to move the tool 12 into the tube of the boiler as far as is desired. When the tool has been moved a sufficient distance into the tube, the gear 9 is caused to reciprocate upon its axis and this acts through the strip 11 to reciprocate the tool 12 in the tube so as to effect the cleaning. The reciprocatory movement of the tool 12 is continued to such extent as is necessary and the position of the tool in the tube is changed from time to time to vary the range of reciprocation of the tool and thus change the area where the cleaning takes place.

Having described my invention, what I claim as new therein and desire to secure by Letters Patent of the United States is:

1. A tube cleaner comprising the combination of a tubular frame, expansible members mounted thereon, a cam mechanism mounted on the frame and engaging said members to expand them, means for operating the cam mechanism, a strip passing through said frame, a tool secured to the strip and means for operating the strip; substantially as described.

2. A tube cleaner comprising the combination of a frame, a gripping member thereon, means for expanding the gripping member radially into engagement with a wall surrounding the frame and member, a cleaning tool and a connecting and power-transmitting member extending through the frame and having the tool secured to its end; substantially as described.

3. A tube cleaner comprising a frame, a tubular part thereon adapted to be inserted in the end of a tube, a circumferential flange at the end of said part to abut against the end of the tube, means for expanding the portion of said part distant from said flange to cause it to grip the tube, a strip passing through said tubular part, a tool secured to said strip, and means for operating said strip, substantially as set forth.

4. A tube cleaner comprising a frame, a tubular part thereon adapted to be inserted in the end of a tube, an operating device mounted on the frame and operable to cause expansion of said part to grip the tube, a strip passing through said part, a tool secured to said strip, and operating mechanism for reciprocating the strip mounted on said frame, substantially as set forth.

5. A tube cleaner comprising a frame, a part thereon adapted to be inserted in the end of a tube, a circumferential flange at the end of said part to abut against the end of the tube, an operating device mounted on the frame and operable to expand the portion of said part distant from the flange to grip the tube, a strip passing through said part, a tool secured to the strip and operating mechanism mounted on the frame and coacting with the strip to reciprocate the tool, substantially as set forth.

6. A tube cleaner comprising the combination of a tubular frame, a part thereon adapted to be inserted in the end of a tube, a circumferential enlargement on the frame adjacent to said part, an operating device mounted on the frame and adapted to expand said part to move it into engagement with a surrounding wall, a strip passing through the tubular frame, a tool secured to the strip and an operating mechanism mounted on the frame and engaging the strip for moving the latter positively both forward and backward in the direction of its length; substantially as described.

7. A tube cleaner comprising the combination of a tubular frame, a supporting handle at one end of the frame, gripping devices mounted on the frame adjacent to the other end thereof and adapted to grip the tube to be cleaned, an operating handle located between the gripping devices and said supporting handle and pivotally mounted upon the frame, means actuated by movement of the operating handle away from the supporting handle to cause the gripping devices to grip the tube, a strip passing through the tubular frame, a cleaning tool mounted on the end of the strip and operating devices mounted on the frame and adapted to reciprocate the strip, substantially as described.

8. A tube cleaner comprising the combination of a tubular frame, a supporting handle at one end thereof, expansible gripping members mounted upon the frame near the opposite end thereof and adapted to be inserted within the tube to be cleaned and expanded to engage the interior surface of the tube, an operating handle pivotally mounted upon the frame, means operated by movement of the operating handle away from the supporting handle for expanding said gripping means into engagement with the tube, a strip passing through the frame, a cleaning tool mounted on the end of the strip and means mounted on the frame for reciprocating the strip, substantially as described.

This specification signed and witnessed this 12th day of January, 1914.

DAVIS S. STOVER.

Witnesses:
LEO C. STEWART,
GEO. F. TURNER.

Copies of this patent may be obtained for five cents each, by addressing the "Commissioner of Patents, Washington, D. C."